United States Patent [19]

Mitchell et al.

[11] 3,902,304

[45] Sept. 2, 1975

[54] TOBACCO HARVESTER

[76] Inventors: John D. Mitchell; Bertram L. Jordan, both of General Delivery, Lewiston, N.C. 27849

[22] Filed: Apr. 24, 1972

[21] Appl. No.: 247,106

Related U.S. Application Data

[63] Continuation of Ser. No. 52,374, July 6, 1970, abandoned.

[52] U.S. Cl. .............................................. 56/27.5
[51] Int. Cl.[2] ....................................... A01D 45/16
[58] Field of Search ..................... 56/27.5; 214/5.5

[56] References Cited
UNITED STATES PATENTS

| | | | |
|---|---|---|---|
| 3,215,288 | 11/1965 | Long et al. | 214/5.5 |
| 3,406,506 | 10/1968 | Shriver et al. | 56/27.5 |
| 3,417,556 | 12/1968 | Jones et al. | 56/27.5 |
| 3,507,103 | 4/1970 | Pickett et al. | 56/27.5 |

*Primary Examiner*—J. N. Eskovitz
*Attorney, Agent, or Firm*—Fred Philpitt

[57] ABSTRACT

A tobacco harvester comprising a main frame, a plurality of wheels operatively connected with said frame to permit movement of the harvester along rows of tobacco plants standing in a field, leaf stripping means, conveyor means supported by said main frame for conveying stripped tobacco leaves generally horizontally with respect to the ground, and lifting conveyor means for receiving tobacco leaves from said generally horizontal conveyor means and for lifting the tobacco leaves upwardly to a higher level, said lifting conveyor means being substantially vertically disposed so that the tobacco leaves are lifted substantially vertically thereby.

13 Claims, 4 Drawing Figures

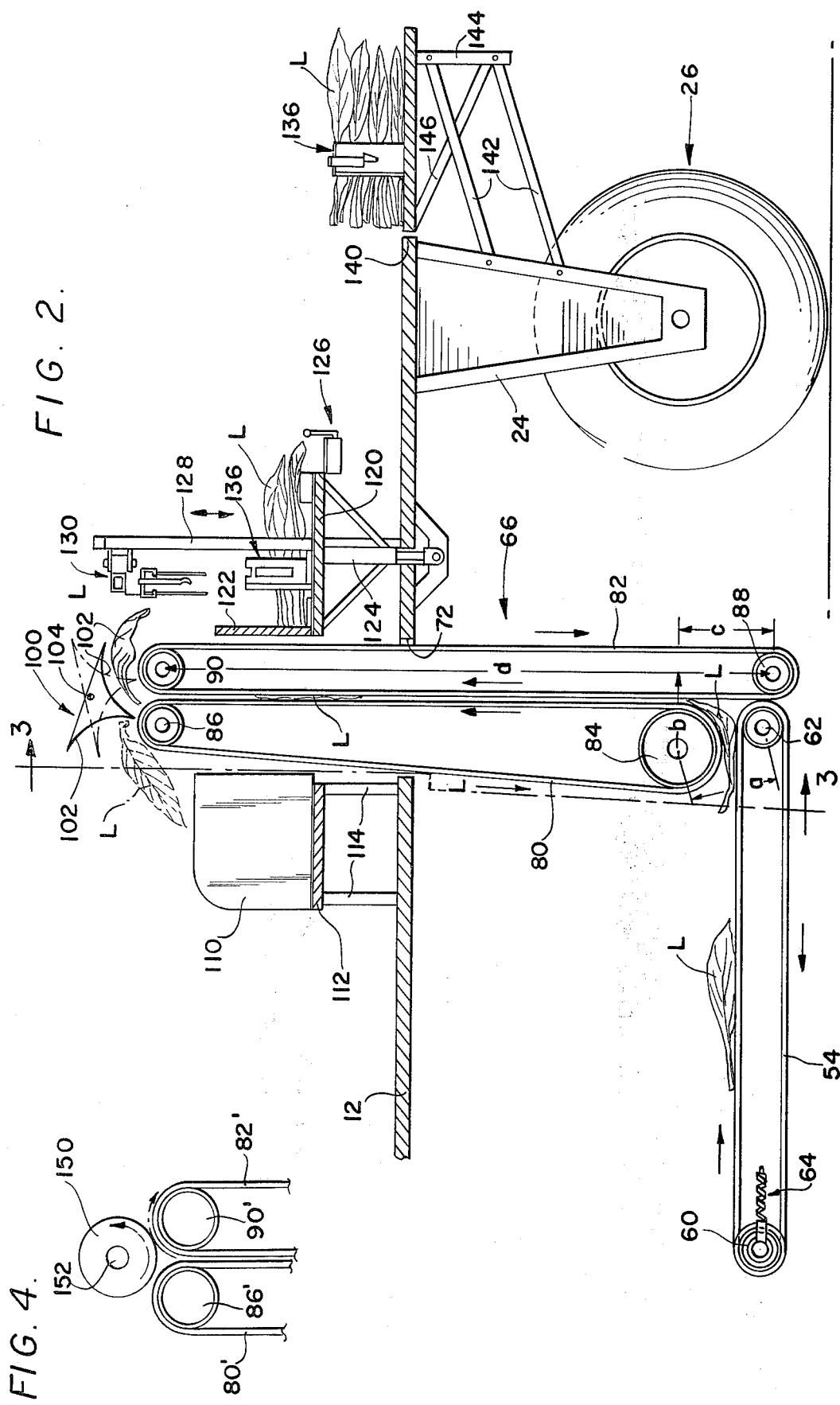

TOBACCO HARVESTER

This is a continuation of application Ser. No. 52,374, filed July 6, 1970 and now abandoned.

BACKGROUND OF THE INVENTION

The present invention relates to a tobacco harvester of the type which automatically strips the leaves from the stalks of tobacco plants standing in a field as the harvester traverses the field. Such an automatic tobacco harvester is disclosed, for example, in U.S. Pat. No. 3,507,103.

In this type of harvester, as it moves through a field, the tobacco stalks are guided into the harvester, and defoliator means is provided for automatically stripping leaves from the tobacco stalks. Lateral conveyor means carries the leaves away from the defoliator means. (In this specification the term "lateral" is intended to encompass both sidewise and rearward movements.)

The leaves of tobacco are carried laterally by said lateral conveyor means, and in the prior art the leaves are then lifted to a higher level by inclined conveyor belts extending at an acute angle to the lateral conveying means. Such inclined conveyor belts have a considerable dimensions longitudinally of the harvester, thereby causing the leaves to be fed upwardly to a point at the rear of the harvester.

It is desirable to provide an arrangement wherein the tobacco leaves can be raised substantially vertically from the lateral conveyor means whereby the leaves are lifted as gently as practical to a higher vertical level at an intermediate point of the harvester whereupon the leaves can be fed either forwardly or rearwardly to suitable packing stations on the harvester. This arrangement considerably enhances the versatility of the harvester and enables the leaves to be handled as desired by personnel standing on the upper portion of the harvester, while reducing the overall length of the apparatus.

SUMMARY OF THE INVENTION

In the present invention, the lifting conveyor means extends substantially vertically so as to provide the aforementioned advantages. Each of the lifting conveyor means includes a pair of conveyor belts spaced from one another a suitable distance to prevent bruising of the tobacco leaves, and yet at the same time ensuring positive vertical lifting of the tobacco leaves. The construction of the lifting conveyor belts may also be such as to create therebetween a zone of reduced pressure which assists in that it gives a lifting effect to the tobacco leaves.

Each lifting conveyor means includes an undershot feeder belt spaced above the associated longitudinal conveyor belt and extending thereabove. Each lifting conveyor means also includes a vertical feeder belt which extends below the upper surface of the associated longitudinal conveyor belt and is also disposed rearwardly thereof. Since a pair of spaced horizontal conveyor belts are provided, two pairs of lifting conveyor belts are provided, each pair being associated with one of the horizontal conveyor belts.

Leaf feed means is disposed at the upper end of each lifting conveyor means and is disposed directly above the space between the lifting conveyor belts. The leaf feed means is movable in opposite directions so as to selectively feed leaves in opposite directions either fore or aft of the lifting conveyor belts as desired.

With the construction of the present invention, harvesting of tobacco leaves can be carried out as a continuous operation as the harvester moves through the field, and the leaves can be readily loaded into small portable containers at the upper portion of the harvester, whereas in the prior art, the leaves have generally been fed into a large leaf receiving bin disposed at the rear end of the harvester.

BRIEF DESCRIPTION OF THE DRAWINGS

FIG. 2 is a vertical longitudinal section through a portion of the harvester shown in FIG. 1, FIG. 4 is a cut-away view of a modified form of the invention.

DESCRIPTION OF THE PREFERRED EMBODIMENTS

Figure 1:
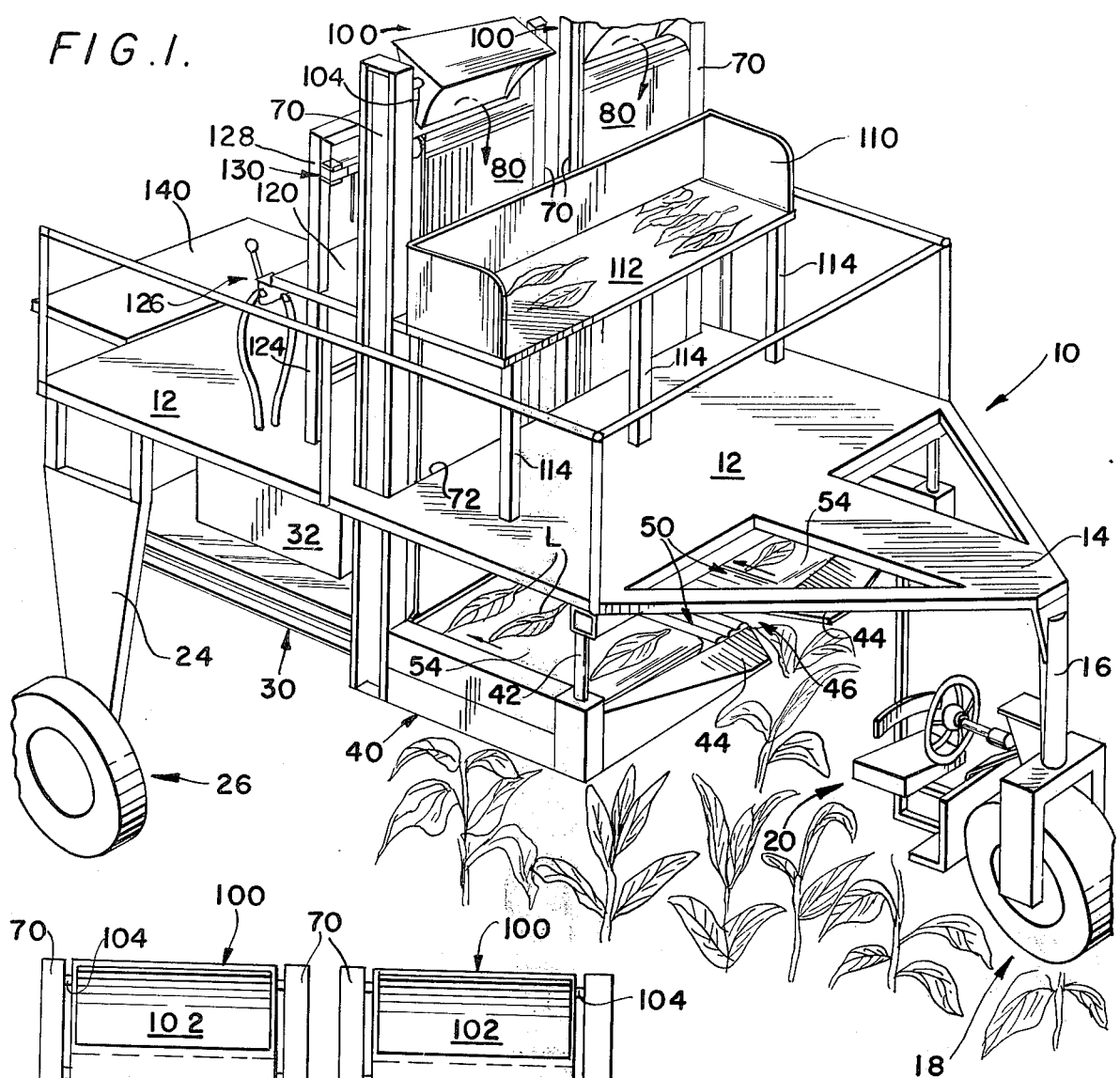
FIG. 1 is a top front perspective view of a tobacco harvester according to the present invention.
Figure 3:
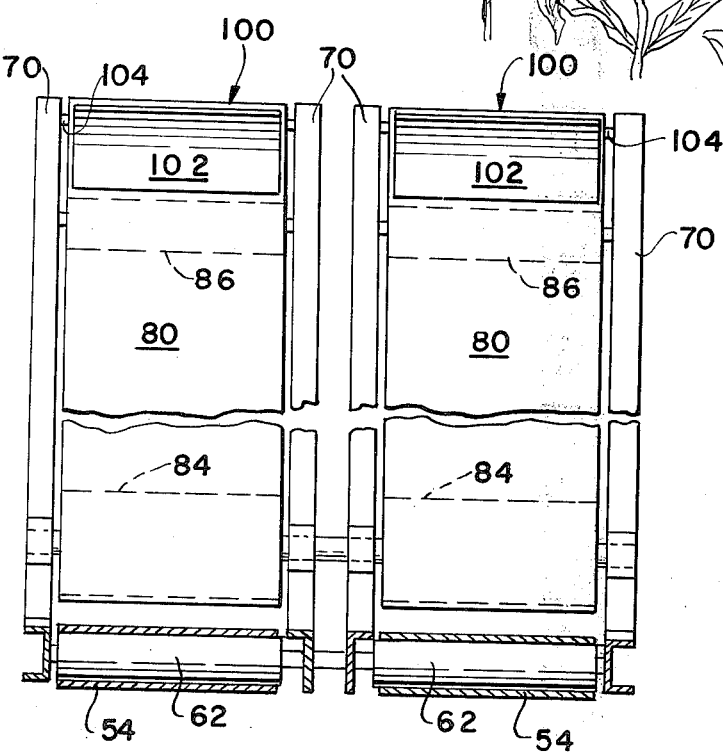
FIG. 3 is a sectional cut-away view taken substantially along line 3—3 of FIG. 2 looking in the direction of the arrows.

Referring now to the drawings wherein like reference characters designate corresponding parts throughout the several views, the tobacco harvester includes a main frame indicated generally by reference numeral 10 and including an upper support platform 12 upon which personnel are adapted to stand during use of the apparatus. The main frame also includes a forwardly extending portion 14, and a depending vertical support means 16 carries a forward wheel 18. A driver's seat, indicated generally by reference numeral 20, is supported by the main frame immediately rearwardly of the forward wheel 18 so that a driver in the driver's seat is able to control movement of the harvester through a tobacco field.

A pair of spaced depending vertical support members 24, only one of which is visible in the drawing, are disposed at the opposite rear corners of the main frame, wheels 26 being carried at the lower ends of vertical supports 24 whereby the overall harvester is supported on three spaced wheels.

A lower frame portion 30 is supported beneath platform 12, and suitable power operated driving mechanism for the apparatus may be disposed in the area 32, this power operated driving mechanism being conventional in the art and not shown for the sake of clarity.

A further lower frame portion 40 is supported by support members 42 depending from platform 12, and a pair of plant guide members 44 are provided on the forward part of the frame portion 40. These guide members 44 preferably include rearwardly and inwardly tapering edges which guide stalks of tobacco into a groove or channel 46 extending longitudinally of the apparatus in a manner similar to that shown in the aforementioned U.S. patent. Suitable defoliator means (not shown) are provided adjacent the elongated groove 46 as shown in said U.S. patent for stripping tobacco leaves from the stalks. The leaves which are removed from the stalks are then carried laterally by lateral conveying means indicated generally by reference numeral 50 in the form of a plurality of driven rollers. The leaves are carried laterally by these rollers onto endless conveyor belts 54 which move the tobacco leaves toward either the rear or the side of the harvester.

As seen in FIG. 2, each of the conveyor belts 54 of the lateral conveyor means comprises an endless belt trained around rollers 60 and 62 one or both of which may be driven in the proper direction. Proper tension is maintained in the belt by a conventional spring loaded belt tightener 64. The lateral conveyor means serves to move the stripped leaves of tobacco from the forward part of the apparatus (where the defoliator means is mounted) to a lifting conveyor means 66, whereupon the leaves of tobacco L are lifted vertically to a higher level.

As seen in FIG. 1, a pair of vertically extending support portions 70 are provided at opposite sides of the harvester and are carried by the main frame for supporting the lifting conveyor means which extends through a suitable transversely extending slot 72 formed in the platform 12. The lifting conveyor means includes two pairs of vertically extending conveyor belts, each pair of conveyor belts being aligned rearwardly of one of the horizontal conveyor means whereby each pair of lifting conveyor belts is operatively associated with one of the horizontal conveyor belts to receive tobacco leaves therefrom and to lift the tobacco leaves upwardly.

As seen most clearly in FIG. 2, each pair of lifting conveyor belts include an undershot feeder belt 80 and a cooperating vertical feeder belt 82. Undershot feeder belt 80 is trained around a pair of rollers 84 and 86 either one or both of which may be driven, and vertical feeder belt 82 is trained around a pair of rollers 88 and 90 either one or both of which may be driven. The drive means for the various rollers of the present invention may be conventional chain and sprocket drive means as is usual in the art.

It will be noted that the undershot feeder belt is spaced above the rear end portion of horizontal conveyor belt 54. On the other hand, vertical feeder belt 82 extends below the upper surface of horizontal conveyor belt 54 and is also disposed rearwardly of the horizontal conveyor belt.

The facing surfaces of the two feeder belts 80 and 82 do not press against each other, but instead are spaced apart far enough to prevent crushing and bruising of the tobacco leaves, but yet not so far apart that they fail to carry the leaves upwardly. More specifically, the space between the facing surfaces of the two feeder belts may have a dimension between approximately one-fourth inch and three-fourths inch, and preferably on the order of five-eighths inch. In a typical example, the dimensions $a$, $b$, $c$ and $d$ as indicated on FIG. 2 may be approximately 8¾ inches, 7¼ inches, 7 inches, and 105½ inches, respectively. The belts are operated at speeds which may produce a reduced pressure zone therebetween which aids in the gentle lifting of tobacco leaves.

It is apparent that as the leaves L are carried rearwardly by horizontal conveyor belt 54, the leaves will pass beneath the undershot feeder belt 80 and thence will engage vertical feeder belt 82 and will be moved upwardly in the space defined between belts 80 and 82. The surfaces of the two belts are preferably not smooth (i.e. have a roughened, undulating, cleated surface) so that at operating speeds the belts create a reduced pressure zone so as to aid in lifting the tobacco leaves upwardly.

A pair of leaf deflector means 100 are provided, each of these leaf feed means being disposed at the upper end of a pair of lifting conveyor belts and directly above the space defined between opposing faces of the belts, each of these leaf deflector means being movable in opposite directions to selectively deflect leaves to one side or the other of the lifting conveyor means.

Each leaf deflector means includes a pair of arcuate guide surfaces 102 which intersect one another. the leaf deflector means is pivotally mounted for swinging movement about the axis of pins 104 whereby the leaf deflector means may be pivoted from the full line position shown in FIG. 2, wherein leaves are diverted rearwardly with respect to the lifting conveyor means, to the phantom line position shown in this figure wherein leaves are diverted forwardly of the lifting conveyor means.

One form of leaf receptacle is indicated by numeral 110 and includes a base portion 112 supported above platform 12 by a plurality of support members 114. Accordingly, when leaves are diverted forwardly of the lifting conveyor means, they are discharged into the loose leaf rack from whence they can be readily loaded into suitable containers. Another form of a leaf receiving means can include a supporting stand 120 that can be moved up or down by selective operation of hydraulic ram means 124 connected to opposite sides of the stand. Hydraulic ram means 124 is selectively operated by a suitable hydraulic control means 126. Vertical movement of the stand 120 is guided by a generally U-shaped framework 128. Means for applying one spiked section 130 of a cooperating bulk rack section 136 is also indicated. Instead of using a two-part rack including one spiked section, it is contemplated using a bulk rack of the type identified as a "Handi-Pak-Rack" manufactured by the Harrington Manufacturing Co. Inc. of Lewiston, N.C., and which is disclosed in U.S. patent application Ser. No. 749,016, filed July 31, 1968.

An elevator means may be provided at the rear end of the harvester (see FIG. 2) and includes an elevator platform 140 which is supported by a pair of parallel links 142, the opposite ends of which are interconnected with vertical support member 24 and a vertical member 144 secured to platform 140. Cross brace members 146 extend between members 140 and 144. This elevator means is adapted to support loaded bulk racks or other leaf receptacles which can be lowered at a suitable discharge point.

Referring now to FIG. 4 of the drawings, a modified form of the invention is illustrated. In this modification, leaf deflector means 100 has been replaced by a cylindrical roller 150 which is rotatable in opposite directions around the longitudinal axis 152 thereof. Conveyor portions of the apparatus similar to those previously described have been given the same reference numerals primed. It is apparent that roller 150 is positioned at the upper end of the lifting conveyor means directly over the space between the opposing faces of the two lifting conveyor belts 80' and 82'.

When roller 150 is rotated in a counterclockwise direction (as indicated by the arrow) leaves will be discharged rearwardly of the lifting conveyor means. On the other hand, if the roller 150 is rotated in a clockwise direction, leaves will be discharged forwardly of the lifting conveyor means. Roller 150 may also be mounted for rocking movement so as to improve the operation thereof if so desired.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. In the known tobacco harvester comprising a main frame, a plurality of wheels operatively connected with said frame to permit movement of the harvester along rows of tobacco plants standing in a field, leaf stripping means, lateral conveyor means supported by said main frame for conveying stripped tobacco leaves generally horizontally with respect to the ground, and lifting conveyor means for receiving tobacco leaves from said lateral conveyor means and for lifting the tobacco leaves upwardly to a higher level, said lifting conveyor means being substantially vertically disposed so that the tobacco leaves are lifted substantially vertically thereby, the improvement in said lifting conveyor means comprising a pair of cooperative conveyor belts that are spaced between one-fourth inch and three-fourths inch from one another and disposed adjacent to an end portion of said lateral conveyor means.

2. Apparatus as defined in claim 1 wherein one of the conveyor belts of said lifting conveyor means comprises an undershot feeder belt spaced above the conveyor belt of said lateral conveyor means and extending upwardly thereabove.

3. Apparatus as defined in claim 1 wherein one of said belts of the lifting conveyor means comprises a vertical feeder belt extending below the upper surface of said lateral conveyor means.

4. Apparatus as defined in claim 3 wherein said vertical feeder belt is also positioned beyond the end portion of said lateral conveyor means.

5. Apparatus as defined in claim 1 wherein said lateral conveyor means comprises a pair of spaced longitudinally extending conveying belts, said lifting conveyor means comprising a pair of conveyor belts aligned with and disposed adjacent the rear end of each of said longitudinal conveyor belts, each pair of belts of said lifting conveyor means including an undershot feeder belt spaced above the associated longitudinal conveyor belt and extending upwardly therefrom and also including a vertical feeder belt extending below the upper surface of the associated longitudinal conveyor belt and further being disposed rearwardly thereof.

6. Apparatus as defined in claim 1 wherein said lateral conveyor means comprises a plurality of rollers that move the tobacco leaves sidewise with respect to the leaf stripping means.

7. Apparatus as defined in claim 1 including directional leaf deflector means disposed at the upper end of said lifting conveyor means to feed leaves in a desired direction.

8. Apparatus as defined in claim 6 wherein said lifting conveyor means includes a pair of conveyor belts defining a vertically extending space disposed therebetween, said leaf deflector means being disposed directly above the said space between the belts.

9. Apparatus as defined in claim 7 wherein said leaf deflector means is movable in opposite directions.

10. Apparatus as defined in claim 8 wherein said leaf deflector means is swingable about a pivot axis.

11. Apparatus as defined in claim 9 wherein said leaf deflector means includes a pair of arcuate guide surfaces.

12. Apparatus as defined in claim 8 wherein said leaf deflector means comprises rotatable means which is rotatable in opposite directions.

13. Apparatus as defined in claim 11 wherein said leaf deflector means comprises a substantially cylindrical roller.

* * * * *